US012692983B2

(12) United States Patent
Bravais et al.

(10) Patent No.: US 12,692,983 B2
(45) Date of Patent: Jul. 28, 2026

(54) DEVICE AND METHOD FOR STORING AND SUPPLYING FLUID

(71) Applicant: L'Air Liquide, Societe Anonyme pour l'Etude et l'Exploitation des Procedes Georges Claude, Paris (FR)

(72) Inventors: Patrick Bravais, Sassenage (FR); Philippe Bourgeois, Sassenage (FR); Gregory Corrado, Sassenage (FR); Simon Carpentier, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 170 days.

(21) Appl. No.: 18/836,802

(22) PCT Filed: Dec. 1, 2022

(86) PCT No.: PCT/EP2022/083990

§ 371 (c)(1),
(2) Date: Aug. 8, 2024

(87) PCT Pub. No.: WO2023/151845

PCT Pub. Date: Aug. 17, 2023

(65) Prior Publication Data

US 2025/0043917 A1 Feb. 6, 2025

(30) Foreign Application Priority Data

Feb. 10, 2022 (FR) ...................................... 2201169

(51) Int. Cl.
*F17C 7/02* (2006.01)

(52) U.S. Cl.
CPC ........ *F17C 7/02* (2013.01); *F17C 2205/0326* (2013.01); *F17C 2221/012* (2013.01);
(Continued)

(58) Field of Classification Search
CPC .......... F17C 2201/054; F17C 2201/056; F17C 2201/058; F17C 2203/032;
(Continued)

(56) References Cited

U.S. PATENT DOCUMENTS 9,746,132 B2 8/2017 Gustafson et al.
9,869,429 B2 * 1/2018 Drube ...................... F17C 7/02
(Continued)

FOREIGN PATENT DOCUMENTS

EP 1 035 368 9/2000
FR 2 706 822 12/1994

OTHER PUBLICATIONS

International Search Report and Written Opinion for PCT/EP2022/083990, mailed Mar. 24, 2023.
French Search Report for FR 2 201 169, mailed Sep. 16, 2022.

*Primary Examiner* — Filip Zec
(74) *Attorney, Agent, or Firm* — Justin K. Murray

(57) ABSTRACT

The invention relates to a device for storing and supplying fluid, comprising a cryogenic tank, a withdrawal circuit comprising a first withdrawal line comprising a first heat exchanger located outside the tank, the withdrawal circuit comprising a set of one or more valves permitting withdrawal, in the process entering the first heat exchanger, an electronic control member for making at least some of the set of valves open/close, when the set of valves is configured to not allow withdrawal, the electronic control member being configured to switch the set of valves to a first state, in which at least a portion of the internal volume of the first heating heat exchanger is fluidically isolated from at least a portion of the rest of the withdrawal circuit, or a second state, in which at least a portion of the volume of the heating heat exchanger fluidically communicates with at least a portion of the rest of the withdrawal circuit.

13 Claims, 1 Drawing Sheet

(52) U.S. Cl.
CPC ................. *F17C 2223/0161* (2013.01); *F17C 2227/0302* (2013.01); *F17C 2265/061* (2013.01); *F17C 2270/0168* (2013.01)

(58) Field of Classification Search
CPC ...... F17C 2203/0341; F17C 2203/0391; F17C 2203/0629; F17C 2205/0326; F17C 2221/012; F17C 2221/017; F17C 2223/0161; F17C 2223/033; F17C 2223/045; F17C 2223/046; F17C 2225/0123; F17C 2225/035; F17C 2225/043; F17C 2225/046; F17C 2227/0107; F17C 2227/0302; F17C 2227/0304; F17C 2227/0309; F17C 2227/0374; F17C 2227/0381; F17C 2227/0393; F17C 2250/032; F17C 2265/061; F17C 2265/066; F17C 2270/0105; F17C 2270/0168; F17C 2270/0171; F17C 2270/0189; F17C 7/02; F17C 7/04; Y02E 60/32
See application file for complete search history.

(56) References Cited

U.S. PATENT DOCUMENTS

| | | | | | |
|---|---|---|---|---|---|
| 10,400,712 | B2 * | 9/2019 | Garner | F17C 13/02 | |
| 10,495,257 | B2 * | 12/2019 | Mathison | F17C 5/007 | |
| 11,525,544 | B2 * | 12/2022 | Clarke | B60L 50/72 | |
| 2002/0177023 | A1 * | 11/2002 | Fleck | H01M 8/04 | 429/436 |
| 2006/0199064 | A1 * | 9/2006 | Arnold | H01M 8/04208 | 429/444 |
| 2009/0288426 | A1 | 11/2009 | Lilletvedt et al. | | |
| 2018/0128210 | A1 * | 5/2018 | Garner | F02M 21/06 | |
| 2018/0306383 | A1 | 10/2018 | Poag et al. | | |
| 2021/0301980 | A1 * | 9/2021 | Hori | G01N 3/06 | |
| 2021/0305595 | A1 * | 9/2021 | Allidieres | H01M 8/04014 | |
| 2021/0396356 | A1 * | 12/2021 | Charbonneau | F17C 7/00 | |

* cited by examiner

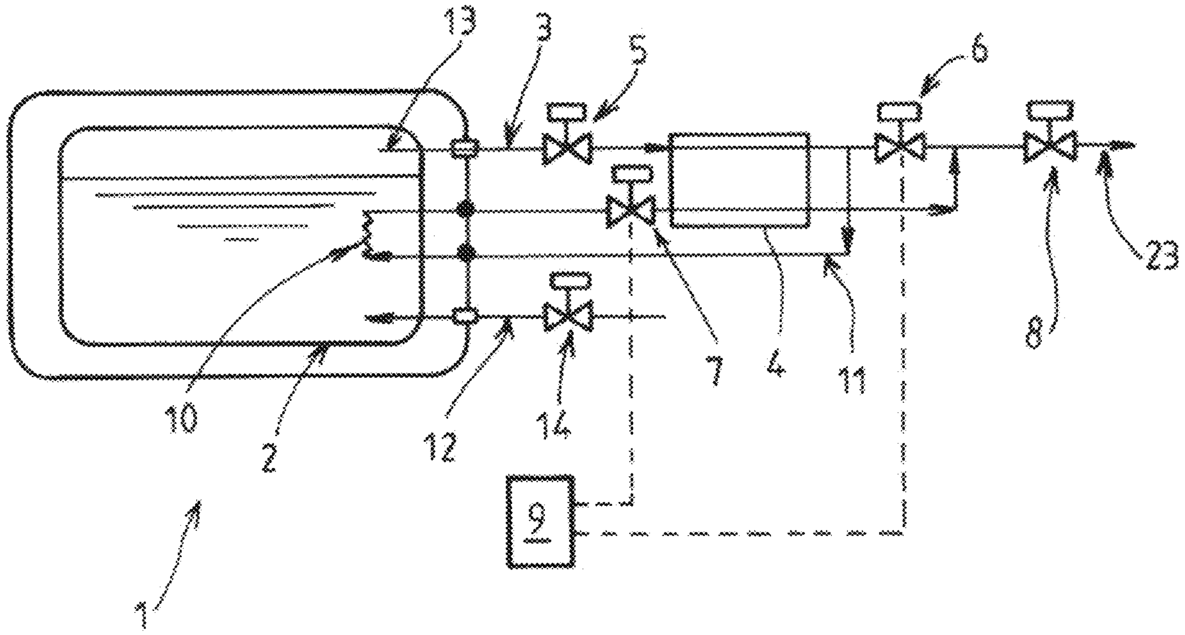
13
3
5
6
10
2
12
14
7
4
11
8
23
9
1

DEVICE AND METHOD FOR STORING AND SUPPLYING FLUID

CROSS REFERENCE TO RELATED APPLICATIONS

This application is a § 371 of International PCT Application PCT/EP2022/083990, filed Dec. 1, 2022, which claims the benefit of FR2201169, filed Feb. 10, 2022, both of which are herein incorporated by reference in their entireties.

FIELD OF THE INVENTION

The invention relates to a device and a method for storing and supplying fluid.

The invention relates more particularly to a device for storing and supplying fluid, notably an on-board device for storing hydrogen and supplying it to a consumer, comprising a cryogenic tank for storing liquefied fluid, a withdrawal circuit comprising a first withdrawal line having an upstream first end connected to the interior of the tank and a downstream second end intended to be connected to a consumer, the first withdrawal line comprising a first heating heat exchanger located outside the tank, the withdrawal circuit comprising a set of one or more valves that is configured to allow or to not allow the withdrawal of a flow of fluid from the first end to the second end, in the process entering the first heat exchanger, the device comprising an electronic control member for making at least some of the set of valves open/close.

BACKGROUND OF THE INVENTION

Liquefied-hydrogen storage devices intended to supply a consumer (fuel cell, combustion engine, turbine or the like) usually include: a double-wall, vacuum-insulated tank (with super-insulation and/or perlite in the space under vacuum so as to be sufficiently autonomous when there is no consumption), a filling line (which is lower and/or works by raining down), a withdrawal line that can draw the gas or the liquid (or both) by means of an external heat exchanger in order to heat the hydrogen to ambient temperature, a safety line (with valves and/or rupture disks, for example), possibly pressure tappings and a system for pressurizing the tank.

The system for pressurizing the tank may have two functions: a first function of pre-pressurization before the fluid is used, for example if the tank is filled at between 1 and 2 bar and the consumer needs a source of pressure typically between 4 and 6 bar (or more) for the operation of their cell or engine, or a second function of maintaining the pressure while the hydrogen is being used. It should be noted that the need for power by the heater is greater if the withdrawal is performed in the gas phase than if withdrawal is performed in the liquid phase.

Pressurization systems (also referred to as PBUs, or Pressure Building Units) may be of several types.

For example, these systems may comprise: an electric heater immersed in the cryogenic tank, an autonomous-heating fluid loop (with a circulation pump) which exchanges heat with the tank, a device of the thermosiphon type with an external evaporator (in the case of mobile delivery trucks, for example), a recirculation loop using the fluid withdrawn by the consumer, which enters an external exchanger, returns to the tank via an internal recirculation loop in order to give up heat and re-enters the external exchanger before going off to the consumer circuit (cf. for example FR2706822A), a device which vaporizes liquid in an external exchanger and then returns it to the tank by way of excess pressure.

An electrical heating system is simplest but it is intrusive and its long-term reliability may be limited. In addition, it requires wall leadthroughs with electrical members.

An autonomous recirculation system requires auxiliary equipment (recirculation pump and source of energy or source of pressure for hot gas).

The solution with a thermosiphon requires placing cryogenic valves and wall leadthroughs under vacuum for the recirculation line which, when it is in use, contains gaseous and liquid hydrogen close to saturation point (−253° C. at 1 bar).

The solution with an external exchanger and a recirculation loop is simple and reliable and therefore very satisfactory for ensuring the pressure is maintained but has the drawback of not being able to perform the function of pre-pressurization before a withdrawal.

SUMMARY OF THE INVENTION

One aim of the present invention is to overcome all or some of the aforementioned drawbacks of the prior art.

In an effort to overcome the deficiencies of the prior art discussed, supra, the device according to the invention, which is furthermore in accordance with the general definition thereof given in the preamble above, is essentially characterized in that, when the set of valves is configured to not allow withdrawal of fluid toward the downstream second end, the electronic control member is configured to switch the set of valves to at least two distinct states: in a first state, at least a portion of the internal volume of the first heating heat exchanger is fluidically isolated from at least a portion of the rest of the withdrawal circuit to enable a spontaneous pressure wave in the withdrawal circuit so as to pressurize the fluid in the tank; in a second state, at least a portion of the volume of the heating heat exchanger fluidically communicates with at least a portion of the rest of the withdrawal circuit to damp such a pressure wave in the circuit.

Furthermore, embodiments of the invention may include one or more of the following features:

- the changeover from the first state to the second state is caused by the opening of at least one valve of the set of valves,
- the changeover from the second state to the first state is caused by the closing of at least one valve of the set of valves,
- the changeover from the first state to the second state or from the second state to the first state is caused by the opening or closing, respectively, of two isolation valves of the set of valves that are located respectively at two ends of the first heat exchanger,
- in the first state, at least one internal passage of the first exchanger located between an inlet and an outlet of the exchanger is fluidically connected to a set of pipes of the withdrawal circuit, and in that, in the second state, said internal passage of the first exchanger is fluidically isolated from said set of pipes of the withdrawal circuit,
- the first withdrawal line comprises a second heating heat exchanger located inside the tank, the set of one or more valves being configured to ensure the passage of a flow of fluid circulating from the first end to the second end, in the process entering the first heat exchanger and then the second heat exchanger or in the process entering solely the first heat exchanger without entering the second heat exchanger, the second heat exchanger forms part of the rest of the withdrawal circuit which is fluidically isolated or not fluidically isolated from the first heating heat exchanger depending on whether the set of one or more valves is in the first state or the second state, in the first state, the withdrawal circuit comprises a section forming a fluid circulation loop whereas, in the second state, the withdrawal circuit does not comprise a section forming a fluid circulation loop, the withdrawal circuit comprises a main line extending between the upstream first end and the downstream second end and a bypass branch which bypasses the main line and forms junctions at two separate locations on the main line, the upstream first end is connected to the upper part of the tank, the set of one or more valves comprises at least one of the following: one or more isolation valves, one or more three-way valves.

The invention also relates to a vehicle, notably a boat or aircraft, comprising such a device.

The invention also relates to a method for storing a cryogenic fluid, for example liquid hydrogen, in a device for storing and supplying fluid comprising a tank for liquefied cryogenic fluid, a withdrawal circuit comprising a first withdrawal line having an upstream first end connected to the interior of the tank and a downstream second end intended to be connected to a consumer, the first withdrawal line comprising a first heating heat exchanger located outside the tank, the withdrawal circuit comprising a set of one or more valves that is configured to implement or to not implement the withdrawal of a flow of fluid from the first end to the second end, in the process entering the first heat exchanger, the method comprising, when the withdrawal circuit does not withdraw fluid toward the downstream second end, a step of switching the set of valves in which at least a portion of the internal volume of the first heating heat exchanger is fluidically isolated from at least a portion of the rest of the withdrawal circuit to enable a pressure wave in the circuit so as to generate heat which pressurizes the fluid in the tank to a given pressure level and/or a step of switching the set of valves in which at least a portion of the internal volume of the first heating heat exchanger fluidically communicates with at least a portion of the rest of the withdrawal circuit to damp any pressure wave in the circuit so as to limit the generation of heat and the pressurization of the fluid in the tank.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

Further particular features and advantages will become apparent on reading the following description, which is provided with reference to the figures, in which:

The FIGURE shows a partial and schematic view illustrating an exemplary embodiment of the structure and operation of a device according to the invention.

DETAILED DESCRIPTION OF THE INVENTION

The illustrated device 1 for storing and supplying fluid may in particular be an on-board device for storing and supplying hydrogen in a vehicle (boat, aircraft, land vehicle such as a truck, for example, etc.).

The device 1 comprises a cryogenic tank 2 for storing liquefied fluid and a withdrawal circuit.

The tank 2 is for example a double-wall tank forming a vacuum-insulated thermal insulation space.

The withdrawal circuit comprises a first withdrawal line 3 having an upstream first end 13 connected to the interior of the tank 2 and a downstream second end 23 intended to be connected to a consumer.

Without this being limiting, the upstream first end 13 is, for example, connected to the upper part of the tank 2 to withdraw gas there.

The first withdrawal line 3 comprises a first heating heat exchanger 4 outside the tank 2 and a set of valves that is configured to allow or to not allow the withdrawal of a flow of fluid from the first end 13 to the second end 23, in the process entering the first exchanger 4. The qualifier "outside the tank" means, for example, that the first heat exchanger 4 is not located in the cryogenic fluid storage volume. As illustrated, this first heat exchanger 4 may be located outside the tank (outside the second shell) but it could be located at least partially in the space between the walls.

The set of valves has, for example, at least one isolation valve (two isolation valves 6, 8 in this example) disposed downstream of the first heat exchanger 4 and upstream of a consumer receiving the withdrawn fluid.

As illustrated, in this example, and without this being limiting, the first withdrawal line 3 comprises a second heating heat exchanger 10 located inside the tank 2 (in the storage volume).

The set of valves is configured to make it possible to ensure the passage of a flow of fluid circulating from the first end 13 to the second end 23, in the process entering the first heat exchanger 4 and then the second heat exchanger 10 or in the process entering solely the first heat exchanger 4 without entering the second heat exchanger 10.

To this end, the withdrawal circuit may comprise a main line extending between the upstream first end 13 and the downstream second end 23 and a bypass branch 11 which bypasses the main line and has two ends which join the main line at two separate locations, for example on either side of one 6 of the two isolation valves disposed in series.

The first heat exchanger 4 preferably has two passages for the withdrawn cryogenic fluid that is to be heated: a first passage for the flow after it leaves the tank 2 and a second passage for the flow leaving the second heat exchanger 10. That is to say, the first heat exchanger 4 may have two inlets and two outlets.

As shown, the main line of the withdrawal circuit may have a valve 5 upstream of a first inlet of the first heat exchanger 4 and two valves 6, 8 in series after a first outlet of this first heat exchanger 4. Another valve 7 is preferably placed upstream of the second inlet of the first heat exchanger 4.

As illustrated, the device 1 may have a separate filling line 12 provided with a valve 14 and having an upstream end intended to be connected to a source of fluid and a downstream end leading into the lower part of the tank 2 (and/or into the upper part of the tank).

For example, it is possible to provide a branch connecting the filling line 12 to the upstream end 13 of the withdrawal line in order to fill the tank from the top, in "raining-down" mode, or from the bottom "at the source", or to withdraw, in liquid or gas form, the fluid consumed by the consumer.

All or some of the valves may be isolation valves controlled or managed by an electronic control member 9 for making the valves open/close. This control member may be integrated in or at least partially remote from the device 1. The electronic control member 9 comprises, for example, a controller, a microprocessor or a programmable computer.

If there is no withdrawal (valve 8 at the downstream end of the main line is closed, for example), the electronic control member 9 may be configured to switch the set of valves to at least two separate states (or configurations).

In a first state, for example referred to as "pressurization" state, at least a portion of the internal volume of the first heating heat exchanger 4 is fluidically isolated from at least a portion of the rest of the withdrawal circuit. That is to say, the withdrawal circuit is closed and split or compartmentalized into different segments which do not fluidically communicate with one another.

This configuration enables a spontaneous pressure wave in the withdrawal circuit, which generates heat and thus pressurizes the fluid in the tank 2. This spontaneous pressure wave is the thermodynamic phenomenon known by the acronym "TACONIS" or "TAO" ("Thermal Acoustic Oscillations").

Thus, if the valve 6 located at the first outlet of the first heat exchanger 4 is closed, the TACONIS phenomenon can develop: a self-sustained pressure wave is generated in the withdrawal circuit between the tank 2 and this closed valve 6. The circuit may be dimensioned specifically for this phenomenon to develop (for example by dimensioning the diameter of the pipes and the lengths of the hot and cold parts of the circuit). This wave has a frequency typically between 5 and 100 Hz that can be calculated as a function of the operating conditions and the geometry of the circuit.

To suppress this phenomenon, this valve 6 may be opened so as to damp the pressure wave by virtue of the enlarged (decompartmentalized) volume for this wave via the opening up of the exchanger.

The set of valves may thus put the circuit into a second state in which at least a portion of the volume of the heating heat exchanger 4 fluidically communicates with at least a portion of the rest of the withdrawal circuit. This increases the volume and notably the length of the enclosed portion of the circuit which generates the waves and damps and suppresses such a pressure wave in the circuit. In this second state, the inputs of heat are minimized.

That is to say, it is possible to generate or to not generate passive heating power (without an energy consuming apparatus), even if fluid is not withdrawn from the tank 2 (or without fluid being withdrawn from the tank 2).

In a variant or in combination, to damp this wave, it could be possible to provide another circuit branch similar to that on which said valve 6 is installed and to place these two branches in communication by opening the valve 6. The two branches will preferably be at the same level in the tank 2 so as not to have the undesired effect of thermosiphon recirculation, which would also result in heat during the waiting phases.

As a result, the structure of the device 1 is configured to make it possible to enable or not enable the Taconis phenomenon depending on the pressure needs in the tank 2.

In a variant, the first state is obtained by closing two valves 6, 7 located on either side of the first heating heat exchanger 4, for example the valve 6 located at the first outlet and the valve 7 located at the second inlet. In this configuration, a passage of the first heat exchanger 4 is isolated from the rest of the circuit at its two ends. The second state may be obtained by opening these two same valves 6, 7. In this configuration, a passage of the first heat exchanger 4 fluidically communicates with the rest of the circuit at its two ends. For example, the circuit forms an intrinsically closed circulation loop which includes this passage and in which a vibratory wave can be damped.

As illustrated, the second heat exchanger 10 may form part of the rest of the withdrawal circuit which is fluidically isolated or not fluidically isolated from the first heating heat exchanger 4 depending on whether the set of valves is in the first state or the second state.

The device 1 thus has a simple, effective and inexpensive pressurization system.

This can generate a heating power, typically of a few tens of watts to several hundred watts, in the tank 2 on demand.

This solution is particularly advantageous for relatively small tanks (for example of a few liters to several hundred liters).

The device may also have a known pressurization system as described in the introduction. In particular an additional system for maintaining the pressurization of the tank may be provided to operate, for example, during the fluid withdrawal phase (notably if the system described above is not sufficient for this other need). It should be noted that this additional heating system is not shown for the sake of simplification.

Of course, the invention is not restricted to the example described above. Thus, instead of or in addition to this first cooling heat exchanger 4, it is possible to use all or some of the volume of another external heating heat exchanger to control this wave phenomenon, for example an exchanger of a separate system for heating and pressurization by recirculation that is used during the withdrawal.

The invention thus makes it possible to implement controlled pressurization even when fluid is not being withdrawn from the tank.

The invention can be applied to any cryogenic fluid, notably hydrogen or helium.

During a withdrawal, the first valve 5 located upstream of the withdrawal line 3 is open, as are the valves 8 downstream of the line 3 (and the one or the two valves 6, 7 for allowing or not allowing the flow to enter the second heat exchanger 10 depending on the pressurization needs of the tank 2).

When there is no withdrawal, the upstream valve 5 and downstream valve 8 are closed and there is no flow in the withdrawal line. In this situation, the one or the two valves 6, 7 may be made to generate or not to generate the vibration phenomenon for supplying or not supplying heat and thus increase or not increase the pressure in the tank 2 as described above. This is obtained without withdrawing fluid from the tank 2. This makes it possible to reliably and repeatably control the appearance of this phenomenon without additional equipment.

For example, this structure makes it possible to generate a pre-pressurization power of around 200 W on demand in order to pressurize a liquid-hydrogen tank of a hundred liters in a few tens of minutes.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for storing and supplying fluid, notably an on-board device for storing hydrogen and supplying the hydrogen to a consumer, the device comprising:

- a cryogenic tank configured to store liquefied fluid;
- a withdrawal circuit comprising a first withdrawal line having an upstream first end connected to the interior of the tank and a downstream second end configured to be connected to a consumer, the first withdrawal line comprising a first heating heat exchanger located outside the tank, the withdrawal circuit comprising a set of one or more valves that is configured to allow or to not allow a withdrawal of a flow of fluid from the first end to the second end; and
- an electronic control member configured to adjust at least some of the set of valves to open/close,
- wherein, when the set of valves is configured to not allow withdrawal of fluid toward the downstream second end, the electronic control member is configured to switch the set of valves to at least two distinct states:
  - in a first state, at least a portion of the internal volume of the first heating heat exchanger is fluidically isolated from at least a portion of the rest of the withdrawal circuit to enable a spontaneous pressure wave in the withdrawal circuit so as to pressurize the fluid in the tank; and
  - in a second state, at least a portion of the volume of the heating heat exchanger fluidically communicates with at least a portion of the rest of the withdrawal circuit to damp such a pressure wave in the circuit.

2. The device as claimed in claim 1, wherein the changeover from the first state to the second state is caused by the opening of at least one valve of the set of valves.

3. The device as claimed in claim 1, wherein the changeover from the second state to the first state is caused by the closing of at least one valve of the set of valves.

4. The device as claimed in claim 1, wherein the changeover from the first state to the second state or from the second state to the first state is caused by the opening or closing, respectively, of two isolation valves of the set of valves that are located respectively at two ends of the first heat exchanger.

5. The device as claimed in claim 4, wherein, in the first state, at least one internal passage of the first exchanger located between an inlet and an outlet of the exchanger is fluidically connected to a set of pipes of the withdrawal circuit, and in that, in the second state, said internal passage of the first exchanger is fluidically isolated from said set of pipes of the withdrawal circuit.

6. The device as claimed in claim 1, wherein the first withdrawal line comprises a second heating heat exchanger located inside the tank, the set of one or more valves being configured to ensure the passage of a flow of fluid circulating from the first end to the second end, in the process entering the first heat exchanger and then the second heat exchanger or in the process entering solely the first heat exchanger without entering the second heat exchanger.

7. The device as claimed in claim 6, wherein the second heat exchanger forms part of the rest of the withdrawal circuit that is fluidically isolated or not fluidically isolated from the first heating heat exchanger depending on whether the set of one or more valves is in the first state or the second state.

8. The device as claimed in claim 1, wherein, in the first state, the withdrawal circuit comprises a section forming a fluid circulation loop whereas, in the second state, the withdrawal circuit does not comprise a section forming a fluid circulation loop.

9. The device as claimed in claim 1, wherein the withdrawal circuit comprises a main line extending between the upstream first end and the downstream second end and a bypass branch which bypasses the main line and has two ends joined to the main line at two separate locations.

10. The device as claimed in claim 1, wherein the upstream first end is connected to the upper part of the tank.

11. The device as claimed in claim 1, wherein the set of one or more valves comprises at least one of the following: one or more isolation valves, one or more three-way valves.

12. A vehicle comprising the device as claimed in claim 1.

13. A method for storing a cryogenic fluid, in the device as claimed in claim 1, the method comprising, when the withdrawal circuit does not withdraw fluid toward the downstream second end:

- switching the set of valves in which at least a portion of the internal volume of the first heating heat exchanger is fluidically isolated from at least a portion of the rest of the withdrawal circuit to enable a pressure wave in the circuit so as to generate heat which pressurizes the fluid in the tank to a given pressure level; and/or
- switching the set of valves in which at least a portion of the internal volume of the first heating heat exchanger fluidically communicates with at least a portion of the rest of the withdrawal circuit to damp any pressure wave in the circuit so as to limit the generation of heat and the pressurization of the fluid in the tank.

* * * * *